July 5, 1938.　　　　O. SIEBLER　　　　2,122,961
WHEEL SUSPENSION FOR AUTOMOBILES
Filed May 4, 1937
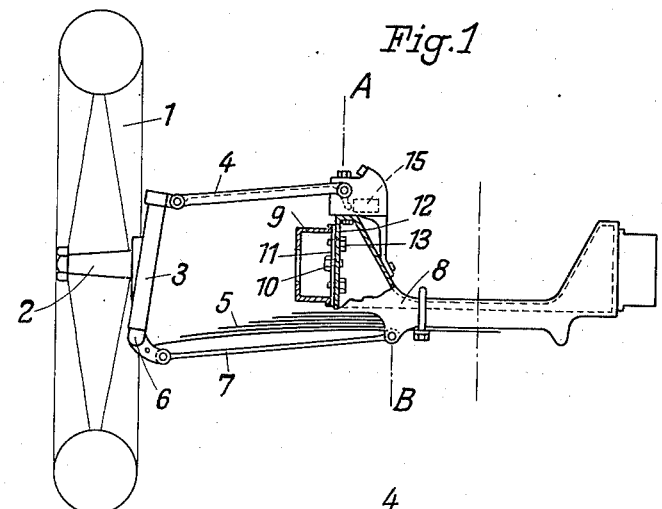
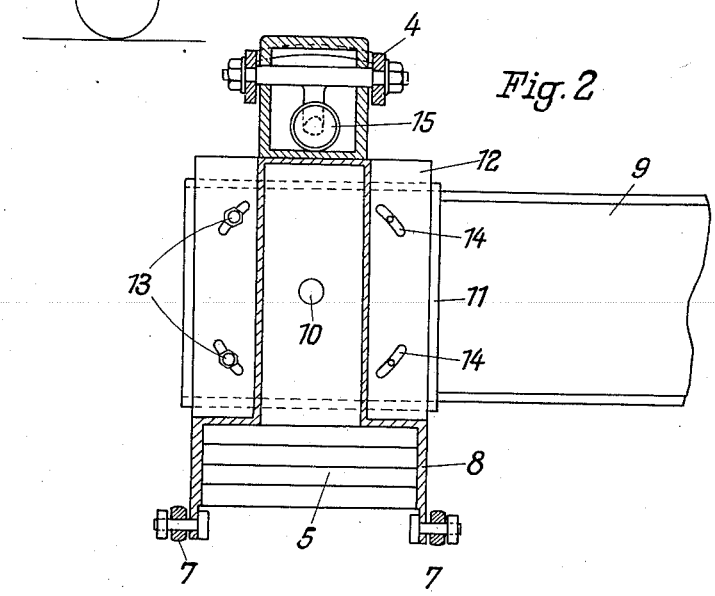
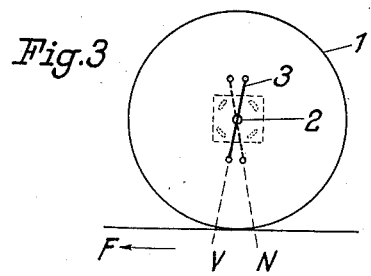
Inventor:
Oscar Siebler Patented July 5, 1938

2,122,961

UNITED STATES PATENT OFFICE 2,122,961

WHEEL SUSPENSION FOR AUTOMOBILES

Oscar Siebler, Zwickau, Germany, assignor to Auto Union Aktiengesellschaft, Chemnitz, Germany Application May 4, 1937, Serial No. 140,754
In Germany May 5, 1936

3 Claims. (Cl. 280—96.2)

The present invention relates to an automobile with independently suspended wheels. The independent suspension of the wheels is intended, amongst other things, to prevent the so-called shimmy, which is an undesirable occurrence with rigid axles. This is however, not entirely accomplished by the independent suspension but with certain conditions as to track and speed a slight shimmy of the wheels and swinging of the vehicle becomes noticeable, which has a detrimental influence on the running properties of the automobile.

In order to damp these shimmy movements, it has been proposed to make the swinging steering arms on the frame adjustable so that by displacing the engaging point of the upper link on the vehicle frame, the forward and rearward rake of the wheels individually is adjustable. In order to effect the adjustment of the forward and rearward rake of both wheels simultaneously, it has been proposed to swing the transverse spring, to the ends of which are connected the lower ends of the steering swivels, relatively to the frame whereby the forward or rearward rake of the wheels is varied. This structure however requires a spherical connection of the steering swivels to the links. This two-point connection of the steering swivels is improved according to the invention by a connection at several points, the links and transverse springs being connected to a common transverse member which is adjustable for the common adjustment of the forward or rearward rake of both wheels relatively to the frame and a transverse axis without affecting the suspension of the wheels. It may, therefore be made very stable as a suspension at several points independently of the adjustment of the forward and rearward rake. The transverse frame member is preferably provided with end flanges and is made rotatable and capable of being fixed on journals on the longitudinal frame member. The position of the transverse member is ensured by screws extending into elongated holes.

In the accompanying drawing the invention is illustrated diagrammatically with reference to a constructional example.

Fig. 1 shows the constructive arrangement in elevation and partly in section,

Fig. 2 is a section on the line A—B of Fig. 1,

Fig. 3 shows the possibility of adjustment of the forward and rearward rack.

1 is the wheel, which is secured in a known manner to the steering swivel 3 by means of its stub axle 2. The steering swivel 3 is connected with the frame at its upper end by means of the link 4 and at its lower end by the transverse spring 5. The link 4 is pivoted to the steering swivel as well as to the frame, so that in cooperation with the transverse spring 5, the steering swivel 3 is guided in the springing direction in the manner of a parallelogram. The spring plate 6 for the transverse spring 5 arranged at the lower end of the steering swivel 3 is prolongated, and its prolongation serves for pivotally attaching the auxiliary link 7 which at its other end is hinged to the frame. Accordingly the suspension of the spring 5 in the spring plate 6 must allow of a certain amount of play in the longitudinal direction. According to the invention the link 4, spring 5 and auxiliary link 7 are arranged on the frame on a separate transverse member 8. This transverse member 8 connects the two longitudinal members 9 together in such a manner that a frame is obtained which is highly resistant to twisting. The transverse member 8 is adjustable about a transverse axis and the adjustability is obtained by the longitudinal members 9 of U-shaped cross-section having journals 10 at their inner open sides, which, for example, are welded or affixed to a welded-on plate 11. The plate 11 serves as guiding surface for the transverse frame member 8 which is provided with flanges 12 and also contains the threaded holes for the securing screws 13. The end flanges of the transverse frame member 8 have holes lying in the swinging axis which serve for accommodating the journals 10 and also guiding slots 14 for the fixing screws 13. The transverse frame member 8 can thus be swung in a simple manner about the journals 10 of the two frame members 9 and can be readily connected with the members 9. The swinging of the transverse frame member 8 is effected after loosening the fixing screws 13, the lengths of the guiding slots 14 limiting the amount of swinging. As shown in Fig. 3 a forward rake of the wheel 1 is indicated by the line V, F being the direction of travel, and can be adjusted by swinging the transverse frame member 8 to any desired extent up to a rearward rack according to the line N. In Fig. 3 furthermore, 3 is the steering swivel and 2 the wheel axle. The lines V and N are axes of the steering swivel 3.

The link 4 is connected to the shock absorber 15 secured at the transverse frame member 8 and thus serves for transmitting the effect of the shock absorber to the wheel as well as for guiding the wheel. Further constructional details, the arrangement and mounting of the links and transverse spring and the securing of the shock absorber are clear from the drawing and are also sufficiently well known.

What I claim is:—

1. Adjustable wheel suspension for varying the forward and rearward rake of independently swinging steering wheels comprising, a longitudinal frame, a transverse frame member journaled on said longitudinal frame, guiding links pivotably mounted on said transverse member and springs extending therefrom for suspending the transverse frame member on the wheels, said transverse frame member being rotatable about said journals, and means for securing said transverse frame member to said longitudinal frame in different rotated positions.

2. Adjustable wheel suspension for varying the forward and rearward rake of independently swinging steering wheels comprising, a longitudinal frame, a transverse frame member journaled on said longitudinal frame, guiding links pivotably mounted on said transverse member and springs extending therefrom for suspending the transverse frame member on the wheels, said transverse frame member being rotatable about said journals, means for securing said transverse frame member to said longitudinal frame in different rotated positions comprising a flange at each end thereof, each flange having elongated openings therein, and screws extending through said openings for securing each flange to the longitudinal frame whereby the rearward and forward rake of both wheels may be adjusted simultaneously by rotating said transverse frame member.

3. Adjustable wheel suspension for varying the forward and rearward rake of independently swinging steering wheels comprising, a longitudinal frame, a transverse frame member rotatably mounted on said longitudinal frame, guide links pivotably mounted on said transverse frame member, springs extending from said transverse frame member for suspending the transverse frame member on the wheels, auxiliary links pivotably mounted on said transverse frame member and all of said links being movable in the swinging planes of the wheels, said transverse frame member being rotatable to simultaneously adjust the rearward and forward rake of both wheels, and means for locking said transverse frame member in an adjusted position on said longitudinal frame.

OSCAR SIEBLER.